United States Patent

[11] 3,565,205

[72] Inventor Fermin Pages Planas
Camelias 27, Barcelona, Spain
[21] Appl. No. 777,047
[22] Filed Nov. 19, 1968
[45] Patented Feb. 23, 1971

[54] HYDRAULIC REACTION SERVO-STEERING DEVICE
8 Claims, 11 Drawing Figs.

[52] U.S. Cl. ..................................... 180/79.2, 91/434
[51] Int. Cl. ..................................... B62d 5/08
[50] Field of Search ..................................... 180/79.2; 91/370, 371, 372, 373, 375 (A), 434; 74/388 (PS)

[56] References Cited
UNITED STATES PATENTS

| | | | |
|---|---|---|---|
| 3,094,010 | 6/1963 | Folkerts | 180/79.2X |
| 3,183,992 | 5/1965 | Brueder | 180/79.2 |
| 3,408,900 | 11/1968 | Tomita | 180/79.2X |

Primary Examiner—Leo Friaglia
Assistant Examiner—John A. Pekar
Attorney—Sughrue, Rothwell, Mion, Zinn and Macpeak ABSTRACT: A hydraulic reaction device for servo-steering of an automobile utilizing hydraulic pressure to supplement the manual steering. A steering shaft and steering spindle cooperate with a distributing valve to provide the desired metering of hydraulic fluid to a double-sided piston. The necessary steering shaft reaction to give the operator the appropriate feel for controlling the vehicle is provided by a pair of opposite acting reaction pistons. The pistons are designed with a notch in their center and have a length much greater than the diameter of the pistons to prevent any possibility of jamming that is associated with smaller length pistons.

HYDRAULIC REACTION SERVO-STEERING DEVICE

The present invention relates to a hydraulic reaction device for servo-steering, primarily intended to be applied to hydromechanical servo-steering mechanisms in motor vehicles, but not to the exclusion of other machines having similar functions, such as aircraft, ships and so forth.

The known types of reaction devices are characterized by the creation of a force opposed to that of the servo-steering, its value being proportional to the actual force exerted for maneuvering the wheels, in order that the driver may perceive part of the first mentioned force, for purposes of steering sensitivity.

This force of reaction, in other systems, is obtained by means of above-mentioned of pistons incorporated into the steering spindle in one and the same transverse plane, which exert the said reaction by hydraulic action. Because of the conditions as regards dimensions to which the design of such pistons is subject, they are small in size and their diameter is practically the same as their length; the result is that jamming arises readily in these pistons, especially as they become worn, which renders the reaction device inoperative and hence reduces the efficiency of the servo-steering mechanism. An object of the present invention is to provide a hydraulic reaction device which overcomes the above-mentioned difficulties. According to the present invention, there is provided a hydraulic reaction servo-steering device in which the steering spindle incorporates, in one and the same transverse plane, a pair of double-acting or reaction pistons acting in opposite directions, markedly greater in length than in diameter, which oppose rotation of the steering shaft, only one face of these pistons being in communication with the pressure side of the piston.

Preferably, the shaft is centralized in relation to the steering shaft and to the body of a distribution valve, having at least two diametrically opposite teeth, on which the simultaneous action of the two reaction pistons is exerted separately.

Conveniently, the teeth for driving the reaction pistons may form part of a cylindrical set of teeth cut in the central shaft, which come up against corresponding recesses or a complementary shape cut in the spindle for limiting the relative rotation between both parts.

The reaction pistons, which move within the steering spindle preferably contain a side notch, which engages with a tooth on the central shaft so as to transmit to the latter a hydraulic force of reaction, without loss of free movement should the steering be worked by hand during failure of the hydraulic action.

In a preferred construction one of the opposite ends of the two cavities housing the reaction pistons in the spindle is closed by a disc or some other closing member.

Preferably also the teeth on the central shaft are of the type having a profile which allows of rolling, such as an involute profile, for example, its sides being applied to the side faces of the internal recesses in the spindle and of the side notches in the reaction pistons, so as to drive them, the involute portion corresponding to the outer part of the profile and being followed by a straight portion which merges into the rounded root of the tooth, in order to strengthen the latter.

Conveniently, the side notches in the reaction pistons present side faces having a profile corresponding to that of the teeth on the central shaft, so as to produce a rolling action.

Advantageously, the recesses within the spindle present side faces having a rolling profile corresponding to that of the teeth on the central shaft, except for two diametrically opposite recesses, which, because of coincidence with the notches in the reaction pistons, do not come into contact with those teeth, because their faces are simply parallel to each other, rounded at the ends.

The invention will be further described by way of example with reference to the accompanying drawings, in which.

Figure 1:
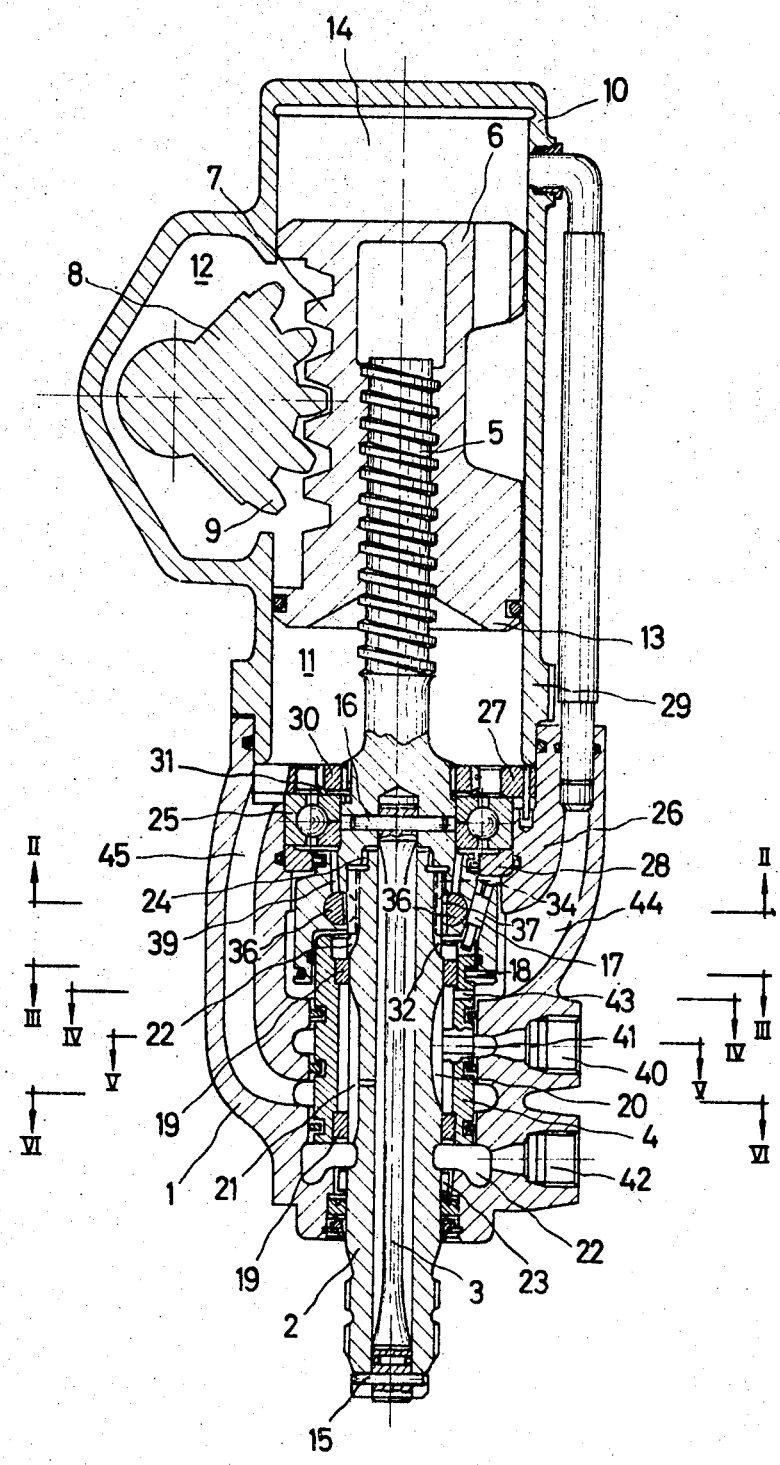
FIG. 1 is a longitudinal section of a servo-steering mechanism fitted with the device according to the invention.
Figure 2:
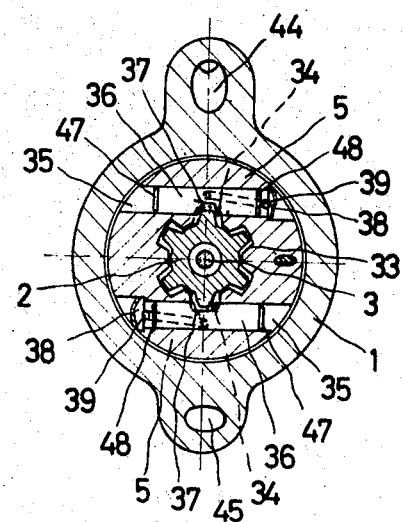
FIG. 2 to 6 are cross sections taken along the lines II—II, III—III, IV—IV, V—V and VI—VI in FIG. 1.
Figure 3:
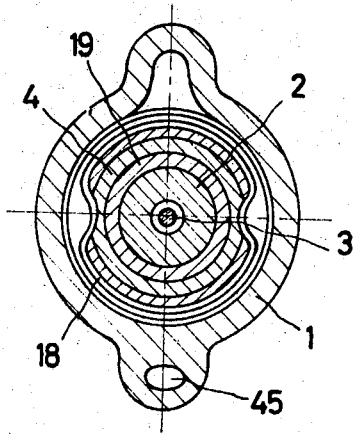

The servo-steering mechanism comprises a housing 1, serving primarily to accommodate a central shaft or steering rotor 2, in which is housed a torsion bar 3, and a sleeve 4.

The shaft 2 is connected to a spindle 5 by the bar 3 for driving the steering mechanism, this spindle 5 being screwed into a slide 6, which carries teeth 7, in engagement with a segment 8, similarly toothed at 9. This part of the mechanism is contained in a casing 10.

The casing 10 contains two compartments 11 and 12, housing the slide 6 and segment 8 respectively. The slide 6 in turn subdivides its compartment into two chambers 13 and 14, in which oil supplied under pressure by the servo-steering acts, the slide itself forming a piston.

The anchoring of the bar 3 to the shaft 2 and the spindle 5 is effected at its ends by means of two pins 15 and 16. The sleeve 4 forms an accurate fit round the shaft 2 and is connected radially to the spindle 5 by an eccentric adjusting extension 17, and longitudinally by a retaining clip 18.

Figure 5:
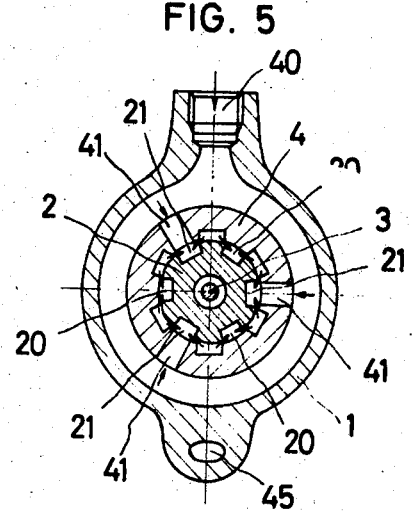

Both the shaft 2 and the sleeve 4 have six longitudinal grooves positioned in such a way that, when the mechanism is in the central position, each groove in the shaft comes opposite the space between two grooves in the sleeve, as shown in FIG. 5.

The grooves in the sleeve 4 are closed at their ends by rings 19. Three grooves 20, in the shaft 2 are short and remain in the space enclosed between the rings 19, whereas three other grooves 21 are long and extend into a throat 22.

One end of the shaft 2 is supported by a bearing 23, while the other end bears on the spindle 5 through the agency of a bearing 24. The spindle 5 itself is supported and fixed axially and radially by a bearing 25, having four-point contact, this being fixed to a casing 26 by two rings 27 and 28, by virtue of the pressure exerted by the anchorage of that casing 26 to a steering mechanism 29.

The bearing 25 is secured to the spindle 5 by a nut 30 and locking washer 31.

The shaft 2 carries teeth 32, which fit with some degree of play into recesses or grooves 33 and 34 in the interior of the spindle 5, which also contains two cavities 35, in which are accommodated and within which move the respective reaction or double-acting pistons 36, provided at the center with a side notch 37, to engage with the teeth 32. This engagement, at particular parts of the stroke, acts similar to that of a rack and pinion.

One end of each cavity 35 is closed by a force-fitted disc 38, or some similar member performing the same function, while the chamber existing between the two pistons 36 and closing members 38 is in communication with the compartment 11 in the steering mechanism through passages 39.

The teeth 32 on the shaft 2 are of involute type or some other rolling profile, the rolling face A being such that the adjacent outer portion B is straight and the root C is rounded so as to give the tooth greater strength.

Figure 8:
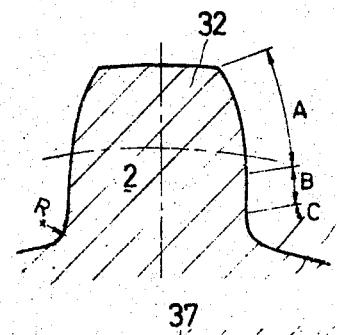
FIG. 8 shows the profile of a tooth on the central shaft.
Figure 10:
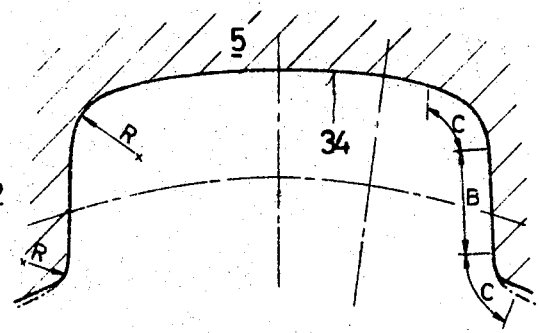
FIG. 10 shows the profile of one recess of those in the shaft which do not engage with the teeth on the spindle.
Figure 9:
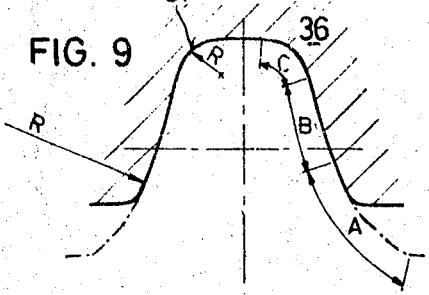
FIG. 9 shows the profile of the side notch in a reaction piston.
Figure 11:
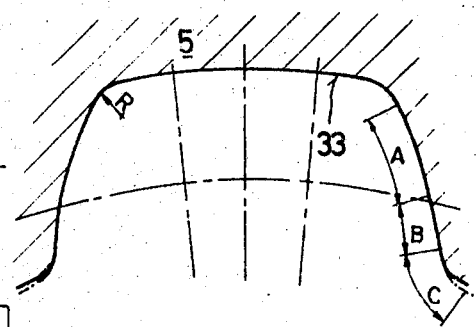
FIG. 11 shows the profile of one recess of those in the shaft which do engage with the teeth on the spindle.
Figure 7:
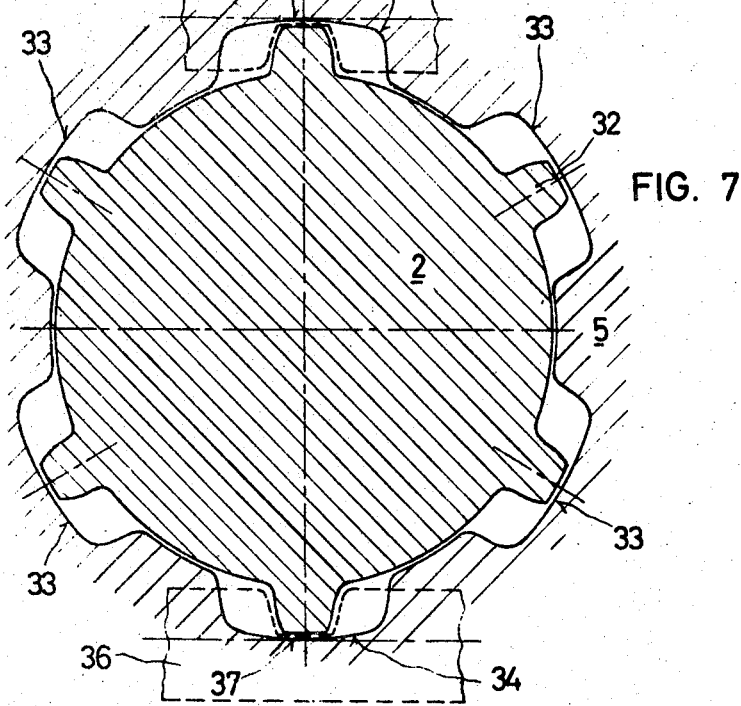
FIG. 7 is a detailed cross section of the zone in which the teeth on the spindle engage with the recesses in the central shaft and the notches in the reaction pistons.

The notches or recesses 37 in the sides of the reaction pistons 36 have a rolling profile corresponding to that of the teeth 32, so that it can be divided likewise into three zones A, B and C, though these differ in size, as can be seen from FIGS. 8 and 9.

The spindle 5, as already mentioned, contains internal recesses 33 and 34, there being four of the former diametrically opposite, which engage with the teeth 32 on the shaft 2, having an involute profile A on the inside followed by a straight portion B, which continues as a rounded outer portion C. The other recesses 34, of which there are two, are diametrically opposite and do not engage with the said teeth 32, as they coincide with the notches 37 in the pistons 36, their side faces B being straight, with rounded zones C at both ends.

For the admission of oil to the valve, inlets are provided at 40 and 41, while an outlet is provided at 42. An aperture 43, and a passage 44, are also provided which communicate with the compartments in the steering mechanism. Another passage 45, with apertures 46, enables the outlet 42 to be placed in communication with the other compartment 11, which in due course acts as the pressure chamber.

The hydraulic pressure exerted on the reaction pistons 36 is produced at their end face 47 and 48.

The mode of operation of this device is as follows:

In the central position, given automatically by the torsion bar 3, the oil entering the valve through the inlet 40 passes through the apertures 41 in the sleeve 4 into the grooves 20, from which, flowing in the direction of the arrows in FIG. 5, it passes to the grooves 21, which direct it via the throat 22 to the outlet 42.

Figure 4:
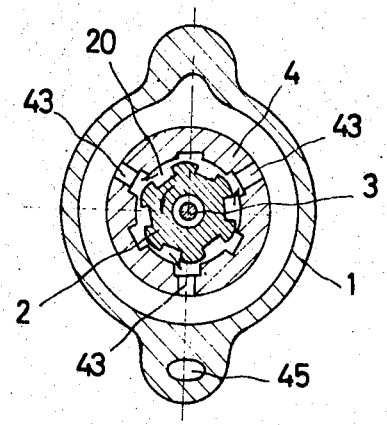

To turn the shaft 2 in a given direction, such as that indicated in FIG. 4, since the spindle 5 exerts torque resistance, the force exerted by the bar 3 must be overcome, this being proportional to the relative angular displacement between the shaft 2 and the spindle 5. The limit of this relative torque is given by the position in which the teeth 32 on the shaft 2 come up against the recesses 33 in the sand spindle 5.

As the shaft 2 turns, the grooves 20 therein are displaced in relation to the grooves in the sleeve 4, so that the circulating oil is forced to follow the direction given by the arrows in FIG. 4, since one direction of circulation is blocked, and passes through the apertures 43 and the passage 44 to one of the compartments in the steering mechanism, exerting pressure on the operating piston thereof and forcing it to move. Simultaneously, the oil passing along the passage 44 also exerts pressure on the face 47 of the pistons 36, so that these act through the teeth 32 on the shaft 2 in a direction opposite to the torque, and hence the force to be produced on the said shaft 2 will have to overcome not only the torque resistance of the torsion bar 3, but also the reaction produced by the pistons 36, which will be proportional to the oil pressure.

When the piston 6 of the steering mechanism moves, because of the oil it receives through the passage 44, it compels the oil contained in the compartment 11 to pass through the passage 45 and apertures 46 in the sleeve, from which it flows through the grooves 21 in the shaft 2 to the outlet 42.

Figure 6:
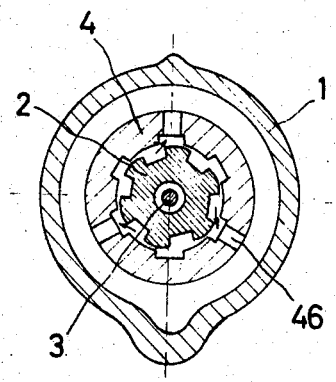

The mode of operation just described applies in the same way to operation in the reverse direction, as shown in FIG. 6, the direction of circulation of the oil simply being reversed and it being borne in mind that the pressure of the oil on the pistons 36 acts on the face 48 thereof, this being received through the apertures 39 connected to the compartment 11.

A feature of fundamental importance to this invention s that the reaction pistons 36, of which there are two, are very long in relation to their diameter, which prevents any possibility of jamming due to sideways movement, such as occurs with ordinary devices for the very reason that they lack this feature, their short pistons being of the so-called "square" type.

At the same time, greater robustness and wear resistance are achieved, all of this resulting in increased reliability fewer breakdowns and less likelihood of its becoming necessary to work the steering mechanism by hand.

Another essential feature is the nature of the tooth profile on the steering shaft and the shape of the recesses in the spindle and the pistons fitted therein.

I claim:

1. A hydraulic reaction servo-steering device comprising a pressure source; a steering shaft; a steering spindle operatively connected to the steering shaft; a pair of reaction pistons acting in opposite directions and each having a length much greater than the diameter of the piston; means for housing each piston, the pistons operatively connected to the steering shaft and opposing rotation of the steering shaft in both clockwise and counterclockwise rotation; and means for placing only one face of each piston in hydraulic communication with the pressure source in a given rotation, whereby a steering shaft reaction is produced by both the reaction pistons.

2. A hydraulic reaction servo-steering device as in claim 1, further including a distribution valve; the steering shaft being centrally positioned and operatively connected to the distribution valve and having at least two diametrically opposite teeth on which the simultaneous action of the two reaction pistons is exerted separately.

3. A hydraulic reaction servo-steering device as in claim 2, where the steering shaft has a cylindrical set of teeth including the teeth driven by the two reaction pistons, and the spindle has complementary teeth adapted to limit the relative rotation between the spindle and shaft.

4. A hydraulic reaction servo-steering device as in claim 3, where the teeth on the steering shaft have an involute profile which permits rolling and the reaction pistons have respectively side notches, the side of the teeth contacting the faces of the spindle teeth and the side notches in the reaction pistons as as to drive them, the involute portion corresponding to the outer part of each tooth profile and being followed by a straight strengthening portion which merges into a rounded root of the tooth.

5. A hydraulic reaction servo-steering device as in claim 1, where the reaction pistons are movable within the steering spindle and further have a side notch which operatively engages one of the teeth of the shaft and transmits to the shaft the hydraulic force of reaction without loss of free movement should the steering be worked by hand in case of failure of the hydraulic system.

6. A hydraulic reaction servo-steering device as in claim 5, where the side notches in the reaction pistons have side faces with a profile corresponding to that of the teeth on the shaft, thereby permitting a rolling action.

7. A hydraulic reaction servo-steering device as in claim 5, where the spindle further has two diametrically opposite recesses between the teeth, and the complementary teeth of the spindle and of the shaft have a rolling profile that contact except for the recesses which, because of coincidence with the notches in the reaction pistons, do not come into contact with teeth of the shaft.

8. A hydraulic reaction servo-steering device as in claim 1, where the means for housing each piston includes closing members.